US008595752B1

(12) United States Patent
Fioravanti et al.

(10) Patent No.: US 8,595,752 B1
(45) Date of Patent: Nov. 26, 2013

(54) HYBRID APPLICATION MESSAGE PASSING

(75) Inventors: Ryan Fioravanti, Kitchener (CA); Matthew Bolohan, Waterloo (CA)

(73) Assignee: Google Inc., Mountain View, CA (US)

( * ) Notice: Subject to any disclaimer, the term of this patent is extended or adjusted under 35 U.S.C. 154(b) by 241 days.

(21) Appl. No.: 13/158,723

(22) Filed: Jun. 13, 2011

(51) Int. Cl.
*G06F 3/00* (2006.01)
*G06F 15/16* (2006.01)

(52) U.S. Cl.
USPC ............ 719/328; 709/203; 709/217; 715/748

(58) Field of Classification Search
None
See application file for complete search history.

(56) References Cited

U.S. PATENT DOCUMENTS

| | | | |
|---|---|---|---|
| 2007/0255810 A1* | 11/2007 | Shuster | 709/219 |
| 2008/0178162 A1* | 7/2008 | Sanford et al. | 717/139 |
| 2010/0042915 A1* | 2/2010 | Ohara et al. | 715/243 |
| 2010/0232429 A1* | 9/2010 | Rao et al. | 370/389 |
| 2011/0055683 A1* | 3/2011 | Jiang | 715/234 |
| 2012/0047425 A1* | 2/2012 | Ahmed | 715/234 |
| 2012/0159308 A1* | 6/2012 | Tseng et al. | 715/234 |
| 2012/0311024 A1* | 12/2012 | Burckhardt | 709/203 |

OTHER PUBLICATIONS

Dynamic Web Coding, "Scripting Iframes—Tutorial and Examples," [online]. www.dyn-web.com, Jan. 2010. Retrieved from the internet: <http://www.dyn-web.com/tutorials/iframes/> 4 pgs.
UIWebView Class Reference, User Experience: Windows & Views. [online] Apple Inc., Nov. 15, 2010. Retrieved from the internet: <http://developer.apple.com/library/ios/#documentation/uikit/reference/UIWebView_Class/Reference/Reference.html> 20 pgs.

* cited by examiner

*Primary Examiner* — Charles E Anya
(74) *Attorney, Agent, or Firm* — Young Basile Hanlon & MacFarlane P.C.

(57) ABSTRACT

In general, techniques for passing data from a native component of an application to a web component of the application without reflowing the top-level document are described. In one example, a web component of an application loads a main document that includes at least two separate frames that each causes the web component to issue an application-layer request specifying a uniform resource identifier (URI). One of the frames causes the web component to issue an application-layer request that specifies a special native request URI. A native component of the application monitors application-layer requests issued by the web component of the application and snoops the URIs specified therein. When the native component identifies an application-layer request specifying a special native request URI, the native component stores a reference to the open application-layer request. Subsequently, the native component may pass a message to the web component by responding to the application-layer request.

14 Claims, 4 Drawing Sheets

HYBRID APPLICATION MESSAGE PASSING

TECHNICAL FIELD

The disclosure relates to computing devices and, more specifically, to application message passing.

BACKGROUND

The use of software frameworks to develop applications for particular environments can improve software quality and reduce development effort. In general, a software framework consists of reusable, common code that provides generic functionality for the environment and well-defined application programming interfaces (APIs). In this way, a software framework improves software modularity by encapsulating implementation details of the common code behind APIs.

Many software frameworks employ self-contained instances of abstract data types, or "components," that provide off-the-shelf functionality to applications being developed within the software frameworks. A component is thus a "black box" that defines a cohesive set of operations behind an API. Components may be reused and adapted by developers to create new applications without having to understand the internal structure and operations of the component. Examples of commercially available software frameworks include Cocoa®, available from Apple, Inc., the .NET application framework and Microsoft Foundation Classes (MFC) available from Microsoft Corp., and Common Object Request Broker Architecture (CORBA) available from Object Management Group. Component examples include Cocoa® components, ASP.NET controls, ActiveX or VBX controls.

SUMMARY

In general, techniques for passing data from a native component of an application to a web component of the application are described. The techniques may be useful for application frameworks that provide for embedding web content into an application using a web component. In such applications, the web component typically executes application logic for the application in response to user interaction with the web component graphical user interface.

This disclosure describes techniques for responding to an open application-layer request, maintained by a web component, to send messages from a native component that intercepts the application-layer request to the web component. In one example, a web component of an application loads a main document that includes at least two separate frames that each causes the web component to issue a respective application-layer request that specifies a uniform resource identifier (URI). At least one of the frames causes the web component to issue an application-layer request that specifies a special native request URI.

A native component of the application monitors application-layer requests issued by the web component of the application and snoops the URIs specified therein. When the native component identifies an application-layer request that specifies a special native request URI, the native component stores a reference to the open application-layer request. Subsequently, the native component may pass a message to the web component by responding to the application-layer request. The message may include data for use by the web component. The message may alternatively, or additionally, include a script that causes the web component to perform some functionality when received responsive to the application-layer request.

The techniques of this disclosure may potentially provide one or more advantages. For example, a native component of an application may provide access to device capabilities that are not directly available to the web component due, e.g., to security, modularity, and functional scope limitations. In some instances, the application framework for the application, or the restricted interface of the web component itself, also limits the ability of native components of the application to pass data to the web component without altering the web content loaded into the web component. The techniques may enable the native component to provide data to and improve control over the operation of the web component without altering the main document loaded into the web component. As a result, the web component may receive messages from the native component and yet avoid re-rendering, or reflowing, the main document, which may increase message passing speed and improve a user experience.

In one embodiment, the disclosure is directed to a method comprising issuing an application-layer request with a web component of an application executing on a computing device, wherein the web component comprises an abstract data type instantiated within a native component of the application, wherein the native component provides access to interfaces of the computing device that are not accessible by the web component. The method also comprises intercepting the application-layer request with the native component, and issuing, with the native component, an application-layer response to the application-layer request.

In another embodiment, the disclosure is directed to a computing device comprising a processor that executes instructions stored by a computer-readable medium to provide a run-time environment for an application. The computing device also comprises a native component of the application, and a web component of the application, wherein the web component is an abstract data type instantiated within the native component, wherein the native component provides access to interfaces of the computing device that are not accessible by the web component. The computing device also comprises an HTTP interface of the web component that issues an application-layer request, and means for intercepting the application-layer request with the native component and issuing an application-layer response to the application-layer request.

In another embodiment, the disclosure is directed to a computer-readable medium comprising instructions that, when executed, perform operations comprising issuing an application-layer request with a web component of an application executing on a computing device, wherein the web component comprises an abstract data type instantiated within a native component of the application, wherein the native component provides access to interfaces of the computing device that are not accessible by the web component. The instructions, when executed, also perform the operations of intercepting the application-layer request with the native component, and issuing, with the native component, an application-layer response to the application-layer request.

The details of one or more embodiments of the disclosure are set forth in the accompanying drawings and the description below. Other features, objects, and advantages of the disclosure will be apparent from the description and drawings, and from the claims.

DETAILED DESCRIPTION

Figure 1:
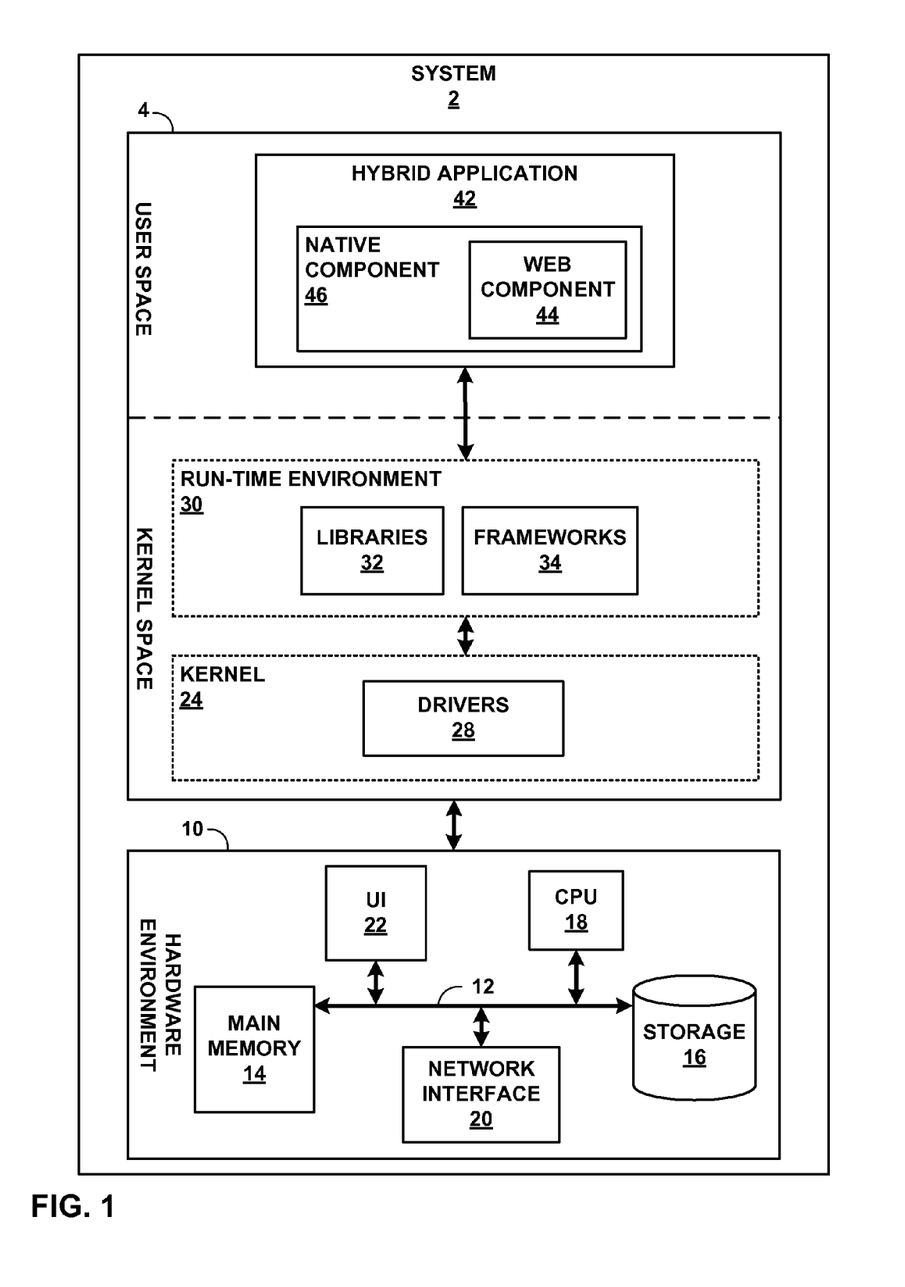
FIG. 1 is a block diagram illustrating an example computing system that includes a software stack, executing in an operating environment provided by a hardware environment, which passes messages in accordance with one or more of the techniques described herein.

FIG. 1 is a block diagram illustrating an example computing system 2 ("system 2") that includes a software stack 4, executing in an operating environment provided by hardware environment 10, that passes messages in accordance with the techniques described herein. System 2 may comprise a desktop/laptop computer, a tablet computer, a hand-held device such as a mobile telephone or personal digital assistant (PDA), a touch-sensitive device, a gaming console or portable gaming platform, or other computing device.

Hardware environment 10 of system 2 comprises central processing unit 18 ("CPU 18"), main memory 14, non-volatile storage 16 ("storage 16"), user interface 22 ("UI 22"), and network interface 20 interconnected via system bus 12. System bus 12 may comprise one or more auxiliary busses each operating according to one or more bus protocols. User interface 22 comprises peripherals to enable interaction between system 2 and a user and/or service. For example, UI 22 may include a display, a mouse, a touch-screen, a keyboard, speakers, a microphone, a global positioning system (GPS) receiver, a camera, one or more accelerometers, and/or other peripherals. Network interface 20 is a wireless or wired interface by which system 2 exchanges data with other networked devices.

CPU 18 executes program instructions loaded into main memory 14 from storage 16 in order to operate software stack 4. CPU 18 may comprise one or more general- or special-purpose processors such as a microprocessor, digital signal processor (DSP), an application specific integrated circuit (ASIC), a field programmable gate array (FPGA), or any other equivalent logic device or combination of such devices. Accordingly, the terms "processor" or "controller," as used herein, may refer to any one or more of the foregoing structures or any other structure suitable for implementation of the techniques described herein.

Storage 16 comprises non-transitory/tangible, computer-readable media, such as computer-readable storage media, that includes volatile and/or non-volatile, removable and/or non-removable media implemented in any method or technology for storage of information such as processor-readable instructions, data structures, program modules, or other data. Non-transitory, computer-readable media includes, but is not limited to, random access memory (RAM), read-only memory (ROM), EEPROM, flash memory, CD-ROM, digital versatile discs (DVD) or other optical storage, magnetic cassettes, magnetic tape, magnetic disk storage or other magnetic storage devices, or any other medium or combination of such media that can be used to store the desired information and that can be accessed by other hardware components of system 2.

Main memory 14 comprises one or more computer-readable storage media, which may include random-access memory (RAM) such as various forms of dynamic RAM (DRAM), e.g., DDR2 SDRAM, or static RAM (SRAM), flash memory, or any other form of fixed or removable storage medium that can be used to carry or store desired program code and program data in the form of instructions or data structures and that can be accessed by other modules of system 2. In some aspects, main memory 14 is non-transitory and/or tangible. Main memory 14 provides a physical address space composed of memory locations addressable by software stack 4.

Software stack 4 includes user processes, including hybrid application 42, executing over a runtime environment 30 that includes system libraries 32 and application frameworks 34 executing over kernel 24. Kernel 24 manages hardware environment 10 using drivers 28 that provide an interface between components of hardware environment 10 and run-time environment 30. Kernel 24 may implement, in cooperation with hardware environment 10 components, a virtual memory system to extend the memory space available to software stack 4. Kernel 24 manages the memory system, processes, threads, the file system, the network infrastructure, and interprocess communication. In some instances, kernel 24 comprises, for example, a Linux or Berkeley Software Distribution (BSD) kernel or other Unix-variant kernel.

Libraries 32 and application frameworks 34 provide a runtime environment 30 that supports the execution of hybrid application 42. Libraries 32 provides a set of interfaces for accessing features of kernel 24, such as threading, networking, standard input/output, the file system, memory management, among others. Application frameworks 34 include one or more application frameworks that each offers related functionality to user applications, such as hybrid application 42. For example, respective application frameworks 34 may provide functionality related to the user interface, web interfaces, media, operating-system services, primitive data types, string manipulation, system configuration, networking, motion, GPS, advertisement management, and contact management. Some aspects of system 2 may support virtual machines within run-time environment 30. For example, each of the user processes executing in run-time environment 30 may operate in a separate process virtual machine to insulate the user processes from one another. That is, in such embodiments, each of the user process operates in a separate instance of the virtual machine. Some aspects of system 2 may implement a system virtual machine that provides a virtual architecture over hardware environment 10.

Each of application frameworks 34 includes a software framework composed of at least one dynamically sharable library having reusable, common code that provides generic functionality for run-time environment 30 and well-defined application programming interfaces (APIs). Some software frameworks of application frameworks 34 include self-contained instances of abstract data types, or "components," that provide off-the-shelf functionality to user applications that inherit or otherwise make use of the software frameworks.

Hybrid application 42 is a user application that operates over run-time environment 30 by calling methods of libraries 32 and/or instantiating components of application frameworks 34. Hybrid application 42 may include native component 46 that provides access to full functionality of run-time environment 30 by interfacing with libraries 32 and/or application frameworks 34.

Hybrid application 42 also includes web component 44, an instance of a web component provided by a software framework of one of application frameworks 34. The primary interface for web component 44 may be a web-based graphical user interface (GUI) that receives code and/or data from a remote server or from native component 46, executes application logic (if any), and renders a display in accordance with browser-based languages, such as Hyper-Text Markup Language (HTML), JavaScript, Cascading Style Sheets (CSS), Flash, eXtensible Markup Language (XML), and eXtensible Stylesheet Language (XSL). Web component 44 may be a browser object embedded within native component 46. In some aspects, hybrid application 42 subclasses a component of one of application frameworks 34 as web component 44. That is, in such aspects, web component 44 includes methods, properties (i.e., public data), and/or events that override or specialize corresponding features inherited by web component 44 from a component provided by one of application frameworks 34.

Web component 44 offers a well-defined API by which native component 46 may interface with and affect the operation of web component 44. Native component 46 controls web component 44 using methods provided by the API of the web component. For example, native component 46 may direct web component 44 to load a document specified by a Uniform Resource Identifier (URI). Otherwise, web component 44 operates substantially independently from native component 46.

Web component 44 may prompt native component 46 using events for which native component 46 has implemented an event handler in the form, for example, of a delegate for the event. A delegate may comprise a native component 46 function referenced by a function pointer passed to web component 44 that, when resolved by web component 44, enables web component 44 to invoke the native component 46 function on the occurrence of some associated event. In this way, native component 46 may respond to events that occur in the context of web component 44. Example events for web component 44 may include events that correspond to loading of an HTML page, application-layer requests, user-initiated events (i.e., clicking an HTML link of an HTML page loaded in web component 44), and time-outs. In some aspects, a "delegate" of web component 44 refers to native component 46, which implements at least a portion of the delegate interface API defined for web component 44.

Native component 46 interfaces with application frameworks 34 and libraries 32 to perform user functionality. For example, native component 46 may interface with application frameworks 34 to receive an image taken by a camera of UI 22 or to receive readings from an accelerometer of UI 22. In some instances, native component 46 may include application logic to generate data or manipulate data received by operation of application frameworks 34 and libraries 32 to interact with drivers 28 or other aspects of kernel 24.

In accordance with the techniques of this disclosure, native component 46 intercepts application-layer requests issued by web component 44 and provides data to web component 44 in corresponding application-layer responses. Application-layer requests may include Hyper-Text Transfer Protocol (HTTP) requests, File Transfer Protocol (FTP) requests, Network News Transfer Protocol (NNTP) requests, Real-time Transfer Protocol (RTP) requests, HTTP requests issued via XMLHttpRequest (XHR), and web socket messages, for example. "Application-layer," as used herein, refers to layer seven of the Open System Interconnection (OSI) model as well as to the application layer of the TCP/IP model. More information concerning the OSI model can be found in a IEEE publication entitled "OSI Reference Model—the ISO Model of Architecture for Open Systems Interconnection," by Hubert Zimmermann, published in IEEE Transactions on Communications, vol. 28, no. 4, dated April 1980.

As a result, native component 46 may provide and mediate access to device capabilities that are not directly available to web component 44 due to, e.g., security, modularity, and functional scope limitations. In some instances, the restricted interface of web component 44 also limits the ability of native components of the application to pass data to web component 44 without altering the web content loaded into the web component. For example, some implementations of web component 44 may offer a scripting interface method, property, or tag by which native component 46 may pass a script to the web component for execution. However, these implementations may trigger a re-rendering, or reflow, by the web component 44 of the GUI or may be limited in the size of the script that may be passed. The techniques may enable native component 46 to provide data to and improve control over the operation of the web component without altering the main document loaded into web component 44. As a result, web component 44 may receive messages from native component 46 and yet avoid reflowing the main document, which may increase message passing speed and improve a user experience.

Figure 2:
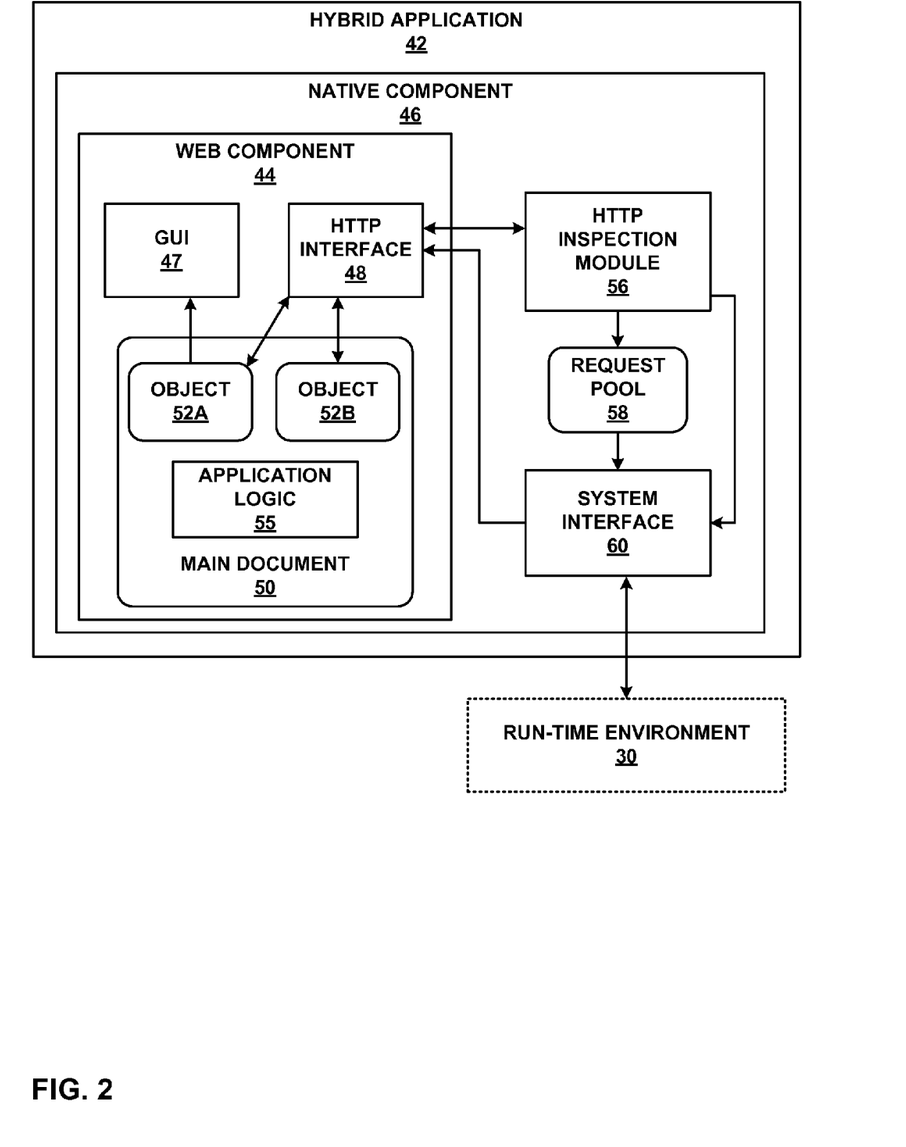
FIG. 2 is a block diagram illustrating an example of a hybrid application that passes messages using application-layer requests and responses in accordance with one or more of the techniques described herein.

FIG. 2 is a block diagram illustrating an example of hybrid application 42 of FIG. 1 in further detail. Native component 46 provides a thin native wrapper around web component 44, which includes loaded main document 50. Main document 50 may include an HTML document that substantially conforms to a particular HTML version (e.g., HTML 5), an XML or ActiveX document, an active server page (ASP), or any other document type that is capable of being loaded by a web browser. Application logic 55 may include JavaScript, PHP: Hypertext Preprocessor (PHP), VBScript, another scripting language, or any other type of executable instructions embeddable within a document and capable of being executed by a web browser. Web component 44 processes and executes application logic 55.

HTTP interface 48 exchanges HTTP requests and responses with native component 46 and remote services to obtain specified resources. HTTP interface 48 may access libraries of run-time environment 30, such as a network protocol stack library or sockets library, to perform HTTP functions.

Objects 52A, 52B (collectively, "objects 52") embedded within main document 50 specify a URI that causes HTTP interface 48 of web component 44 to issue respective HTTP requests to retrieve the specified resources. In this example, object 52A is a visible object that, upon receipt of the resource by HTTP interface 48 in an HTTP response, causes web component 44 to render the retrieved resource to graphical user interface 47 ("GUI 47"). The retrieved resource may include, for example, an HTML document, an image or other media, or a CSS script. Accordingly, each of objects 52 may represent an object element of an HTML document that substantially conforms to HTML. Each of objects 52 may represent, for example, an IFRAME, IMG, APPLET, SCRIPT, or META element, or any other object for which web component 44 requests a resource external to web component 44. Object 52B specifies a special native request URI, which HTTP interface 48 issues within an HTTP request. Object 52B may be a hidden object, such as a hidden IFRAME, that web component 44 does not render to GUI 47. Object 52B may be dynamically generated by execution of application logic 55. In this way, object 52B may be refreshed without forcing reflowing of elements of main document 50 to GUI 47, where reflowing refers to the process of computing the geometry of formatting objects that correspond to the geometric information for elements in the content model, such as frames. In some instances, application logic 55 is distributed to objects 52.

The special native request URI is a particular string identifiable by HTTP inspection module 56. In some instances, the special native request URI may be an element of a URI scheme. In a URI scheme, run-time environment 30 maps a directive, e.g., "native:", to hybrid application 42. When run-time environment 30 identifies an application-layer request conforming to the directive, the run-time environment 30 passes the request to system interface 60 for storage to request pool 58.

HTTP inspection module 56 intercepts HTTP requests issued by HTTP interface 48 of web component 44 and analyzes the respective URIs specified therein. HTTP inspection module 56 may be a delegate of web component 44 or of a particular method of web component 44. The default response by HTTP inspection module 56 for intercepted HTTP requests includes passing the intercepted HTTP requests to system interface 60 for output to run-time environment 30 and output from the system to a remote service provided, for instance, by a remote HTTP server that is separate and distinct from system 2. In some instances, the default response by HTTP inspection module 56 for a particular HTTP request includes returning a Boolean or other value to HTTP interface 48 that grants permission to the interface to proceed with issuing the HTTP request to the remote service.

When HTTP inspection module 56 identifies the special native request URI specified by object 52B within an HTTP request, however, HTTP inspection module 56 cancels the default response and instead stores a reference to the HTTP request in request pool 58. An HTTP request is an application-layer message. Request pool 58 includes a data structure, such as a queue or list, to store one or more HTTP requests previously issued by HTTP interface 48. Request pool 58 may store pointers to HTTP request structures, e.g., strings, in system memory. Alternatively, request pool 58 may store the HTTP request structures. HTTP inspection module 56 may associate open HTTP requests in request pool 58 with a receipt time to allow the HTTP inspection module to flush expired HTTP requests. In this way, native component 46 maintains a request pool 58 of open HTTP requests issued by HTTP interface 48, for which HTTP interface 48 expects an HTTP response. That is, an open application-layer request is a request for which the requesting entity is expecting a response.

Native component 46 generates messages and/or receives messages via system interface 60 from run-time environment 30 that are directed to web component 44. For example, native component 46 may receive from run-time environment 30 messages indicating that the orientation of system 2 has rotated, providing GPS coordinates, or providing image data from a photograph taken by a camera of system 2.

For each message, system interface 60 obtains a reference to an open HTTP request stored by request pool 58 and encapsulates the message in a proper HTTP response generated by system interface 60 for the HTTP request. System interface 60 then provides the HTTP response to HTTP interface 48, which decapsulates and passes the message to object 52B.

Messages within HTTP responses passed by system interface 60 to HTTP interface may include executable instructions, such as JavaScript. In these cases, web component 44 detects that object 52B received requested data and obtains a reference to object 52B. In instances where object 52B is an IFRAME, web component 44 may obtain a reference to the body of object 52B. Web component 44 parses the received data as executable instructions and executes the instructions. The instructions may, for example, direct web component 44 to update object 52A to include image data or GPS coordinates provided in the message. As another example, the instructions may direct web component 44 to rotate the GUI 47 display.

After receiving the message, web component 44 reopens object 52B to cause HTTP interface 48 to issue an additional HTTP request specifying the special native request URI. HTTP inspection module 56 identifies the special native request URI and adds the HTTP request to the request pool 58 to ensure that additional messages directed to web component 44 may be sent in an HTTP response to an open HTTP request. Because open HTTP requests issued by HTTP interface 48 may time out, web component 44 reopens object 52B after a specified time has elapsed to cause HTTP interface 48 to issue a new HTTP request specifying the special native request URI. In addition, HTTP inspection module 56 flushes open HTTP requests stored by request pool 58 to remove timed-out requests.

In some cases, system interface 60 may receive messages having lengths that exceed allowable sizes for HTTP responses. System interface 60 divides the message into multiple segments and sends each segment to HTTP interface 48 in a separate HTTP response. HTTP interface 48 reassembles the application-layer data from the multiple HTTP responses received and passes the data to object 52B.

Figure 3:
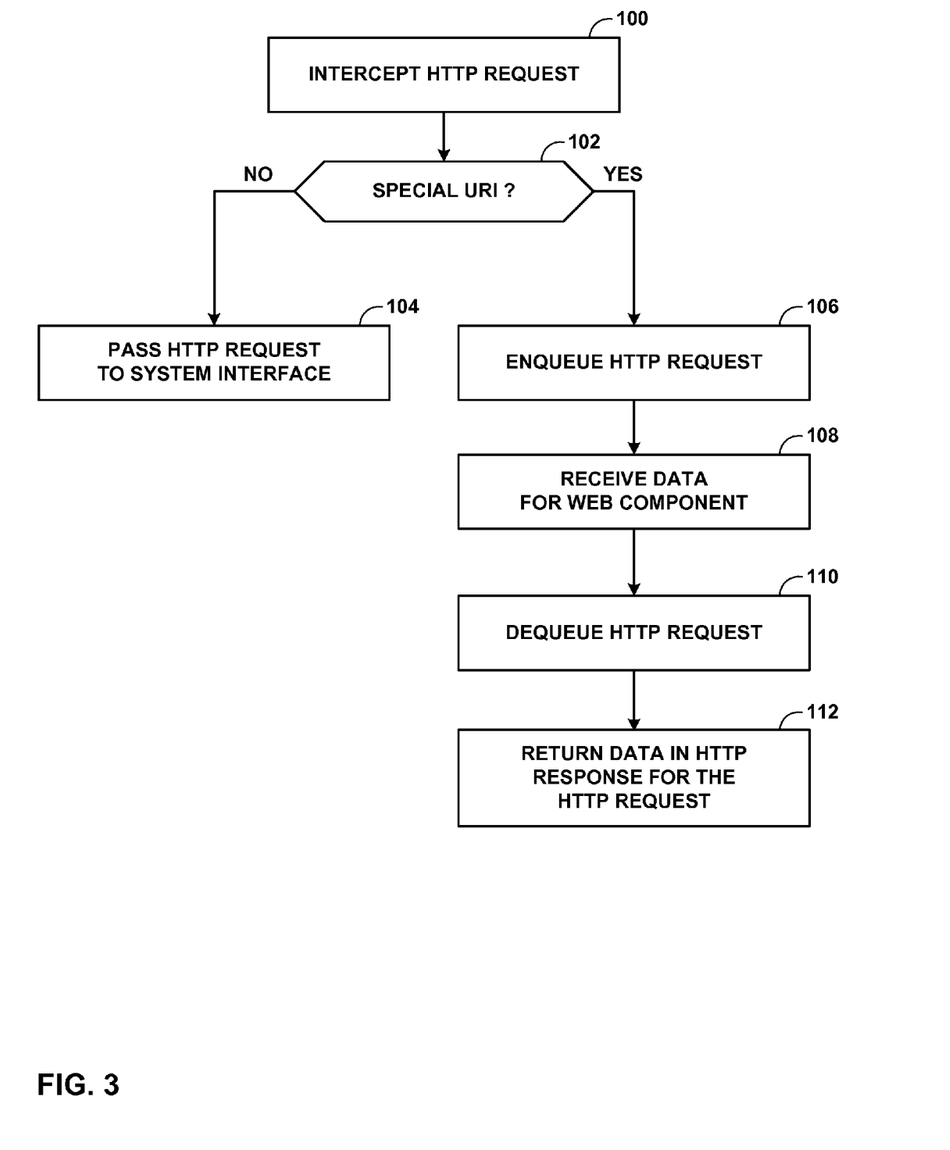
FIG. 3 is a flowchart illustrating an example operation of a native component, such as the native component of FIG. 2, to store open application-layer requests from a web component and pass data to the web component in corresponding application-layer responses using one or more of the techniques described herein.

FIG. 3 is a flow chart illustrating an example operation of a native component, such as native component 46 of FIG. 2, to store open HTTP requests from a web component and pass data to the web component in corresponding responses using one or more of the techniques described herein. For purposes of illustration only, the example operation illustrated in FIG. 3 will be described below in reference to the various components shown in FIG. 2.

HTTP inspection module 56 of native component 46 intercepts an HTTP request issued by web component 44 of hybrid application 42 (100). Upon reading the URI specified by the HTTP request, HTTP inspection module 56 determines whether the specified URI maps to a special native request URI (102). HTTP inspection module 56 passes HTTP request that specify ordinary URIs (NO branch of 102) to system interface 60 for output to run-time environment 30 (104). For an HTTP request that specifies a special native request URI (YES branch of 102), HTTP inspection module 56 enqueues the open HTTP request to request pool 58 (106).

Native component 46 receives via system interface 60 data for web component 44 (108). Such data may be received by operation of one or more peripherals, such as a GPS, accelerometer, or camera of a device that executes hybrid application 42. System interface 60 dequeues an open HTTP request from request pool 58 and encapsulates the received data within a well-formed HTTP response for the open HTTP request (110). In some aspects, native component 46 may manipulate the received data by embedding the data within an executable script, for example, and then encapsulating the manipulated data within the well-formed HTTP response. System interface 60 then sends the HTTP response to web component 44 to pass the data to the web component as an application-layer message (112).

Figure 4:
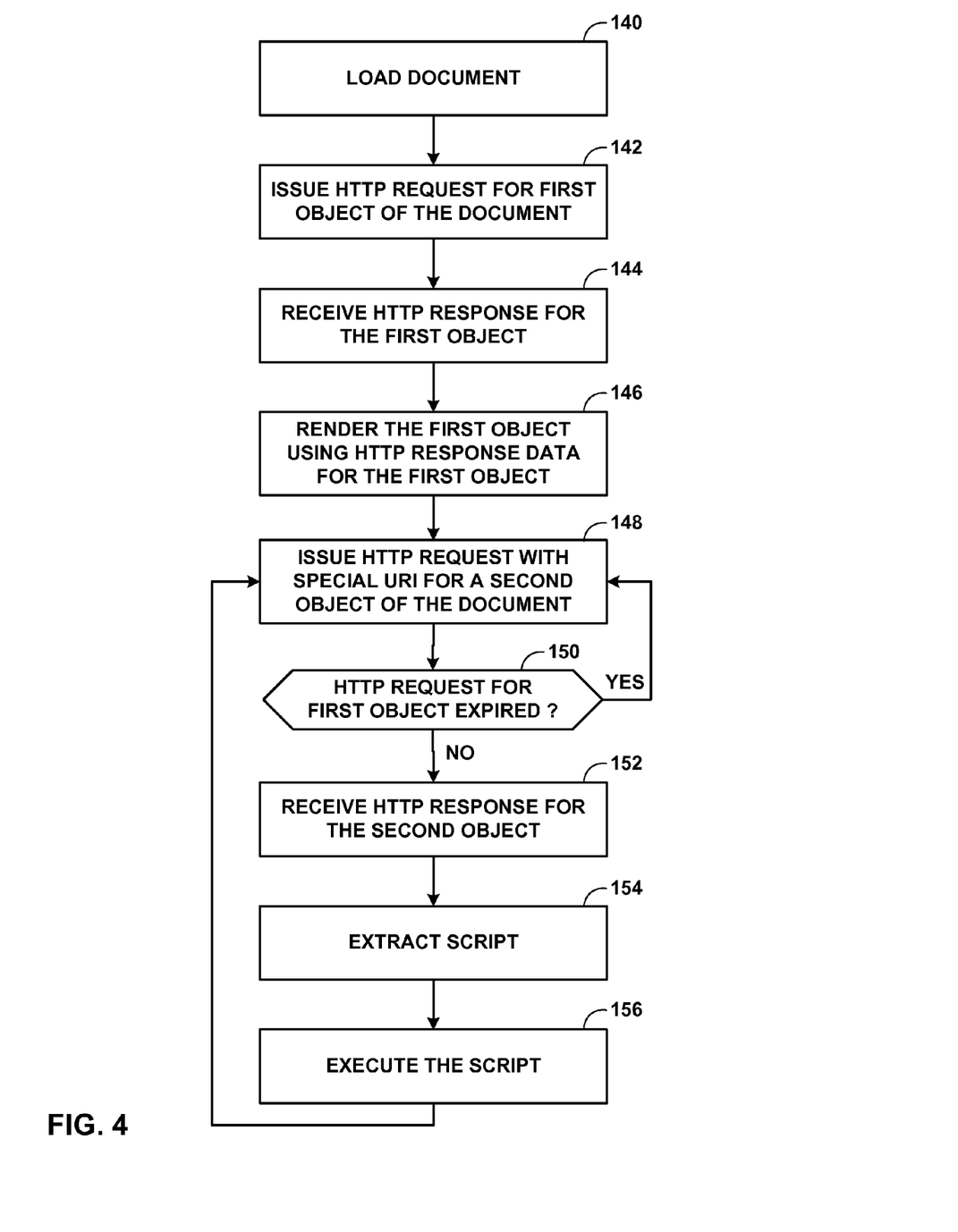
FIG. 4 is a flowchart illustrating an example operation of a web component, such as the web component of FIG. 2, to issue HTTP requests and receive HTTP responses in accordance with one or more of the techniques described herein.

FIG. 4 is a flowchart illustrating an example operation of a web component, such as web component 44 of FIG. 2, to issue requests (e.g., HTTP requests) and receive responses (e.g., HTTP responses) in accordance with one or more of the techniques described herein. For purposes of illustration only, the example operation illustrated in FIG. 4 will be described below in reference to the various components shown in FIG. 2.

Web component 44 initially loads, either autonomously or under direction from native component 46, main document 50 that includes objects 52A, 52B that each specify a resource (140). As part of the load process, HTTP interface 48 issues an HTTP request for the resource specified by the first object 52A (142) and receives a corresponding HTTP response for the first object 52A (44). Web component 44 renders the first object 52A using application-layer data received in the corresponding HTTP response (146).

As an additional part of the load process, HTTP interface 48 issues an HTTP request for the resource specified by the second object 52B (148). The specified resource is a special native request URI. If HTTP interface 48 does not receive a response within an expiration time for the issued HTTP request (YES branch of 150), HTTP interface 48 issues a fresh HTTP request specifying the special native request URI (148). Upon receiving an HTTP response for the issued HTTP request for the second object 52B (152), web component 44 extracts the application-layer message, which may include an executable script (154). If included, web component 44 then executes the executable script (156), and HTTP interface 48 issues a new HTTP request for the second object 52B (148).

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a non-transitory computer data medium such as RAM, ROM, NVRAM, EEPROM, flash memory, magnetic or optical data storage media, and the like. The code or instructions may be software and/or firmware executed by processing circuitry including one or more processors, such as one or more DSPs, general purpose microprocessors, ASICs, FPGAs, or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

Various embodiments of the disclosure have been described. These and other embodiments are within the scope of the following claims.

The invention claimed is:

1. A method comprising:
    issuing an application-layer request with a web component of an application executing on a computing device having a user space and a kernel space within a software stack, wherein the web component comprises an abstract data type instantiated within a native component of the application to include functionality inherited from a software framework within the kernel space, the native component is located within the user space, and the native component provides access to interfaces of the computing device that are not accessible by the web component;
    intercepting the application-layer request with the native component;
    issuing, with the native component, an application-layer response to the application layer request;
    loading a main document with the web component, wherein the main document comprises a first object and a second object, and wherein the first object causes the web component to issue the application-layer request and the second object includes a document reference that causes the web component to issue a subsequent application-layer request;
    receiving the application-layer response with the web component; and
    after receiving the application-layer response with the web component, reopening the first object to cause the web component to issue the subsequent application-layer request for the first object.

2. The method of claim 1, further comprising:
    storing a reference to the application-layer request with the native component;
    intercepting the subsequent application-layer request with the native component of the application; and
    storing a reference to the subsequent application-layer request with the native component.

3. The method of claim 1, wherein the application-layer response includes a script, the method further comprising:
    executing the script with the web component.

4. The method of claim 1, wherein the first object specifies a special native request Uniform Resource Identifier (URI) that causes the web component to issue the application-layer request; and the method further comprising:
    receiving a document with the web component responsive to the subsequent application-layer request; and
    rendering a display output for the web component using the document.

5. The method of claim 4, wherein the first object and the second object are each selected from the group consisting of IFRAME, IMG, APPLET, SCRIPT, and META Hyper-Text Markup Language elements.

6. The method of claim 4, wherein the second object is hidden.

7. The method of claim 1, further comprising:
    receiving, with the native component, data from one of the interfaces of the computing device that is not accessible by the web component; and
    encapsulating, with the native component, the data in the application-layer response.

8. The method of claim 1, further comprising:
    receiving, with the native component, data from one of the interfaces of the computing device that is not accessible by the web component;
    incorporating, with the native component, the data within an executable script; and
    encapsulating, with the native component, the executable script within the application-layer response.

9. The method of claim 1, wherein the application-layer request comprises a Hyper-Text Transfer Protocol (HTTP) request.

10. The method of claim 1, further comprising:
registering a Uniform Resource Identifier (URI) for a URI scheme with a run-time environment of the computing device, wherein intercepting the application-layer request comprises identifying the URI in the application-layer request with the run-time environment and passing the application-layer request to the native component.

11. The method of claim 1, further comprising:
intercepting the subsequent application-layer request with the native component;
determining, with the native component, whether the subsequent application-layer request specifies a special native request Uniform Resource Identifier (URI);
issuing, with the native component, an additional application-layer response to the subsequent application-layer request when the subsequent application-layer request specifies the special native request URI; and
granting, with the native component, permission to the web component to issue the subsequent application-layer request to a remote server when the subsequent application-layer request does not specify the special native request URI.

12. The method of claim 1, further comprising:
processing, with the web component, the application-layer response to the application-layer request without reflowing display output for the web component.

13. A computing device comprising:
a processor that executes instructions stored by a computer-readable medium to provide a run-time environment for an application, the run-time environment located within a kernel space of a software stack of the computing device;
a native component of the application, the native component located within a user space of the software stack;
a web component of the application, wherein the web component is an abstract data type instantiated within the native component to include functionality inherited from a software framework within the kernel space, the native component is located within the user space, and the native component provides access to interfaces of the computing device that are not accessible by the web component;
a Hyper-Text Transfer Protocol (HTTP) interface of the web component that issues an application-layer request; and
an HTTP-inspection module of the native component that intercepts the application-layer request and issues an application-layer response to the application-layer request;
wherein the web component is configured to:
load a main document, wherein the main document comprises a first object and a second object, and wherein the first object causes the web component to issue the application-layer request and the second object includes a document reference that causes the web component to issue a subsequent application-layer request;
receive the application-layer response with the web component;
after receiving the application-layer response with the web component, reopen the first object to cause the web component to issue the subsequent application-layer request for the first object.

14. A non-transitory computer-readable medium comprising instructions that, when executed, perform operations comprising:
issuing an application-layer request with a web component of an application executing on a computing device, wherein the web component comprises an abstract data type instantiated within a native component of the application, wherein the native component provides access to interfaces of the computing device that are not accessible by the web component;
intercepting the application-layer request with the native component;
issuing, with the native component, an application-layer response to the application layer request;
loading a main document with the web component, wherein the main document comprises a first object and a second object, and wherein the first object specifies a special native request Uniform Resource Identifier (URI) that causes the web component to issue the application-layer request;
issuing, with the web component, an additional application-layer request, wherein the second object includes a document reference that causes the web component to issue the additional application-layer request;
receiving a document with the web component responsive to the additional application-layer request; and
rendering a display output for the web component using the document;
receiving the application-layer response with the web component; and
after receiving the application-layer response with the web component, reopening the first object to cause the web component to issue a subsequent application-layer request for the first object.

* * * * *